United States Patent
Ponikiewski et al.

(10) Patent No.: US 11,046,353 B2
(45) Date of Patent: Jun. 29, 2021

(54) STEERING ASSIST DEVICE

(71) Applicant: TRW Steering Systems Poland Sp. Z.o.o., Czechowice-Dziedzice (PL)

(72) Inventors: Pawel Ponikiewski, Swinna (PL); Artur Wojtalik, Katowice (PL)

(73) Assignee: ZF Steering Systems Poland Sp. Z.o.o.

( * ) Notice: Subject to any disclaimer, the term of this patent is extended or adjusted under 35 U.S.C. 154(b) by 159 days.

(21) Appl. No.: 16/510,231

(22) Filed: Jul. 12, 2019

(65) Prior Publication Data
US 2020/0031384 A1 Jan. 30, 2020

(30) Foreign Application Priority Data
Jul. 25, 2018 (EP) .................................. 18461593

(51) Int. Cl.
*B62D 1/19* (2006.01)

(52) U.S. Cl.
CPC .................................. *B62D 1/195* (2013.01)

(58) Field of Classification Search
CPC ........... B62D 1/19; B62D 1/192; B62D 1/195
USPC .................................. 74/492, 493; 280/777
See application file for complete search history.

(56) References Cited

U.S. PATENT DOCUMENTS

| | | | | | |
|---|---|---|---|---|---|
| 5,609,364 A | * | 3/1997 | Fouquet | ................. | B62D 1/195 280/777 |
| 5,669,634 A | * | 9/1997 | Heinzman | ............. | B62D 1/195 280/777 |
| 5,720,496 A | * | 2/1998 | Riefe | ..................... | B62D 1/195 188/371 |
| 5,961,146 A | * | 10/1999 | Matsumoto | ............. | F16F 7/123 280/777 |
| 6,578,872 B2 | * | 6/2003 | Duval | .................... | B62D 1/195 280/777 |
| 7,472,924 B2 | * | 1/2009 | Ikegaya | ................... | B62D 1/19 280/777 |
| 8,033,574 B2 | * | 10/2011 | Menjak | ................... | F16F 7/123 280/777 |
| 8,764,064 B2 | * | 7/2014 | Riefe | ..................... | B62D 1/195 280/777 |

(Continued)

FOREIGN PATENT DOCUMENTS

| | | |
|---|---|---|
| JP | S60-127285 U | 8/1985 |
| WO | 2014132062 A2 | 9/2014 |
| WO | 2016142673 A1 | 9/2016 |

*Primary Examiner* — Toan C To
(74) *Attorney, Agent, or Firm* — Robert James Harwood

(57) ABSTRACT

A support bracket assembly, for fixing a shroud of a steering column assembly to a vehicle, includes: a support bracket fixable to the shroud; and a capsule assembly for interconnecting the support bracket with a fixed part of the vehicle. The capsule assembly further includes a capsule body; and an energy-absorbing strap; wherein the capsule body and energy-absorbing strap are configured to be fixed to the fixed part of the vehicle. Prior to an application of a predetermined force to the support bracket, the capsule body, energy-absorbing strap, and support bracket are interconnected by a connector and further wherein, upon application of the predetermined force to the support bracket, the connector is configured to separate from the capsule body whilst continuing to interconnect the energy-absorbing strap and support bracket.

20 Claims, 4 Drawing Sheets

(56) References Cited

U.S. PATENT DOCUMENTS

| | | | | |
|---|---|---|---|---|
| 2008/0084055 A1* | 4/2008 | Cymbal | ................. | B62D 1/195 |
| | | | | 280/777 |
| 2009/0090210 A1* | 4/2009 | Menjak | ................. | B62D 1/195 |
| | | | | 74/492 |
| 2016/0001809 A1* | 1/2016 | Kingston-Jones | ...... | F16F 7/123 |
| | | | | 74/492 |

* cited by examiner

STEERING ASSIST DEVICE

CROSS-REFERENCE TO RELATED APPLICATIONS

This application claims priority to European Patent Application No. EP18461593.8, filed 25 Jul. 2018, the disclosure of which is incorporated herein by reference in its entirety.

TECHNICAL FIELD

The present invention relates to steering column assemblies that permit a steering wheel to collapse in a controlled manner in the event of a crash by controlled breakaway of a portion of the steering column assembly from a mounting bracket that secures it to the main body of the vehicle. More particularly, the invention relates to a support bracket assembly for fixing a shroud of a steering column assembly to a vehicle.

BACKGROUND

It is known to provide a steering column assembly comprising a shroud that houses a steering shaft. The steering shaft connects a steering wheel to the road wheels of the vehicle allowing the driver to rotate the steering wheel in turn to move the road wheels. The connection may be through a rack and pinion gearbox, and, to assist the driver, a hydraulic or electric assistance may be provided. In the case of electric assistance, a motor will act upon the steering shaft or a part of the steering between the shaft and the road wheels to apply a torque in the same sense as that applied by the driver.

The shroud may be non-adjustable in a simple arrangement in which it is fixed directly to a support bracket that is secured to the vehicle body, for instance to a beam that extends across the vehicle behind the dashboard. In other cases, it may be adjustable for rake or reach or both rake and reach. This may be achieved by connecting the shroud to a support bracket though an adjustable clamp mechanism, the support bracket in turn being fixed to the mounting bracket. During adjustment, the clamp assembly is released and the shroud can be moved up or down, or along, the support bracket.

To improve safety, it is known for the shroud to be telescopic so that in the event of a crash where the driver is thrown onto the steering wheel it can collapse and allow the wheel to move with the driver. This requires the shroud to be normally fixed to the vehicle body so it cannot move during normal use but able to break away and move in the event such a crash occurs. To achieve this, it is known to secure the shroud, or the support bracket fixed to the shroud, to the mounting bracket using one or more breakaway capsule assemblies. These are designed to provide a rigid connection during normal use but to breakaway when a predetermined load is applied to them. Once broken, the shroud can move relative to the mounting bracket. An energy absorbing mechanism may be provided to absorb the energy associated with the movement so that one broken the movement is controlled.

SUMMARY

In accordance with a first aspect, there is provided a support bracket assembly for fixing a shroud of a steering column assembly to a vehicle, the support bracket assembly comprising: a support bracket fixable to the shroud; and a capsule assembly for interconnecting the support bracket with a fixed part of the vehicle. The capsule assembly further includes a capsule body; and an energy-absorbing strap; wherein the capsule body and energy-absorbing strap are configured to be fixed to the fixed part of the vehicle. Prior to an application of a predetermined force to the support bracket, the capsule body, energy-absorbing strap, and support bracket are interconnected by a connector and further wherein, upon application of the predetermined force to the support bracket, the connector is configured to separate from the capsule body whilst continuing to interconnect the energy-absorbing strap and support bracket.

The interconnecting the energy-absorbing strap and support bracket with the same connector that allows separation of the support bracket and capsule body allows a more compact assembly to be achieved. Furthermore, the number of parts in the assembly may be reduced. The capsule body may include a capsule aperture for receiving a further connector for connecting the capsule body to the fixed part of the vehicle.

The energy-absorbing strap may include a strap aperture for receiving a further connector for connecting the energy-absorbing strap to the fixed part of the vehicle. The capsule aperture and strap aperture may be aligned or substantially aligned such that they can receive the same further connector. Providing aligned apertures in the capsule body and energy-absorbing strap means that only a single further connector is required for fixing the assembly to a vehicle and the assembly can be more compact.

The energy-absorbing strap may be seated on the capsule body. The capsule body may include a wall that at least partially surrounds the energy-absorbing strap. The energy-absorbing strap may be located within a perimeter of the capsule body. Positioning the energy-absorbing strap on the capsule body and within its perimeter ensures that a compact arrangement is possible.

The connector may be configured to slidably separate from the capsule body. The connector may be configured to slidably separate from a guide in the capsule body. The guide may be in the form of a slot or a notch. A tension of the connector may at least partially determine the predetermined force to separate the connector from the capsule body. The connector may comprise a rivet. The connector may be retained within through-holes in the energy-absorbing strap and support bracket. The energy-absorbing strap may include a plurality of energy-absorbing parts, the energy-absorbing parts having different rates of energy absorption.

The term "rates of energy absorption" is intended to refer to the energy required to extend the energy-absorbing strap a set distance in the direction of separation of the capsule body and the support bracket. A higher rate of energy absorption means that more energy is required to separate the capsule body and support bracket by the same distance as a part with a lower rate of energy absorption.

The plurality of energy-absorbing parts may include a first part with a first rate of energy absorption and a second part with a second rate of energy absorption. The second rate of energy absorption may be higher than the first rate of energy absorption. The plurality of energy-absorbing parts may include a third part with a third rate of energy-absorption. The third rate of energy absorption may be higher than the second rate of energy absorption.

The plurality of energy-absorbing parts may include a loop. The loop may be configured to deform without tearing of the energy-absorbing strap. The loop may be the first energy-absorbing part to deform upon separation of the capsule body and support bracket. The loop may therefore deform with a low energy absorption relative to that of other parts of the energy-absorbing strap. By ensuring it is the first part of the energy-absorbing strap to deform, it can be ensured that deformation of other parts of the energy-absorbing strap, which may have much higher rates of energy absorption, do not interfere with the initial separation force required for separation of the capsule body from the connector.

The plurality of energy-absorbing parts may include a first frangible portion having a weakened section defining a tear direction of the first frangible portion. The plurality of energy-absorbing parts may include a second frangible portion having a weakened section defining a tear direction of the second frangible portion. Each weakened section may comprise a groove, score, perforation, or other weakening feature.

The energy-absorbing strap may have an extension direction, the tear direction of the first frangible portion being substantially aligned with the extension direction and the tear direction of the second frangible portion being inclined at an angle to the extension direction. The term "extension direction" may be defined as the direction of separation of the capsule body and support bracket, along which the energy-absorbing strap extends. The support bracket may be mounted within the capsule body. The capsule body may include two body portions positioned on opposing sides of the support bracket.

The capsule assembly may further comprise an additional connector that interconnects the two body portions. The support bracket assembly may include two capsule assemblies located at opposing sides of the support bracket. Each of the capsule assemblies may include any of the features as described above.

The shroud may be arranged such that it is telescopically adjustable relative to a lower shroud. The shroud may therefore be called an upper shroud. After an impact, the upper shroud may collapse onto the lower shroud, such that the combined length of the upper shroud and lower shroud is less than it was prior to collapse. The lower shroud may be connected to a fixed or substantially part of the vehicle, such as a steering gearbox. Except where specifically excluded, for practical or other reasons, the term "connector" is considered to include any means of mechanical interconnection including, but not limited to, a bolt, rivet, screw, pin or other coupling or fastener.

In accordance with a second aspect there is provided a steering column assembly comprising: a mounting bracket; a support bracket assembly according to the first aspect, the support bracket assembly being fixed to the mounting bracket; and a steering column including a shaft and a shroud, the shroud being supported by the support bracket assembly.

BRIEF DESCRIPTION OF THE DRAWINGS

Hereinafter the present disclosure shall be illustrated in detail by way of an embodiment and with reference to the enclosed drawings, wherein.

DETAILED DESCRIPTION

Figure 1:
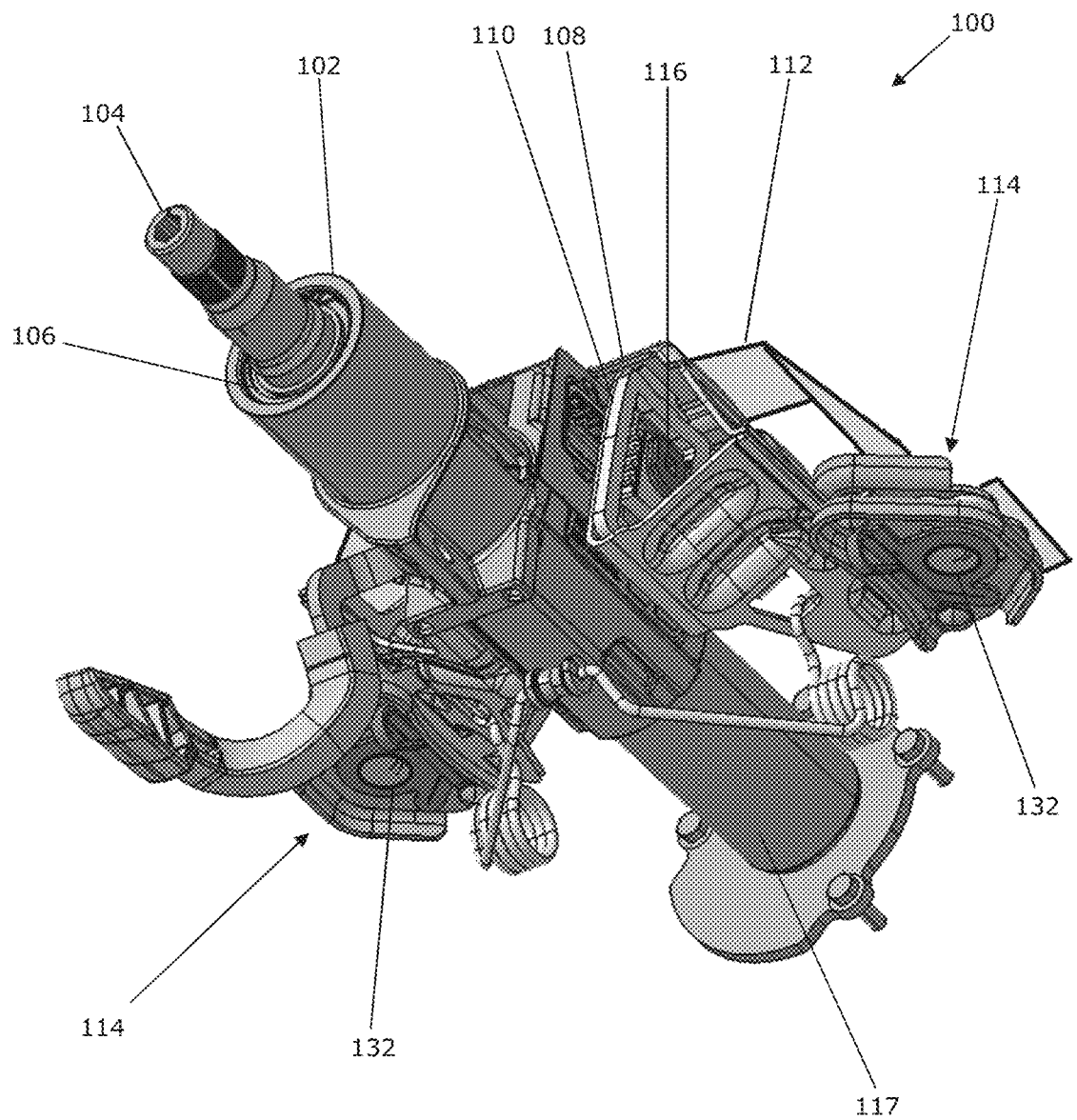
FIG. 1 is a perspective view of a steering column assembly including a support bracket assembly in accordance with the first aspect.

Referring firstly to FIG. 1, there is shown a steering column assembly 100 comprising a shroud 102 that houses a shaft 104. The shaft 104 is configured to be attached to a steering wheel (not shown). The shaft 104 is supported by a bearing assembly 106 that allows rotation of the shaft 104 relative to the shroud 102. A support bracket 108 includes two arms 110 that depend in a substantially vertical direction and provide support and stability to the shroud 102. A mounting bracket 112 is connected to the support bracket 108 by capsule assemblies 114 situated at each side of the support bracket 108. For clarity, the mounting bracket 112 is only shown in FIG. 1. A clamping assembly 116 is configured to allow movement of the shroud 102 relative to the support bracket 108 in an unclamped condition and to prevent movement of the shroud 102 relative to the support bracket 108 in the clamped condition. Clamping assemblies 116 are well-known in the art and therefore further description of the same is omitted, for brevity.

Figure 4:
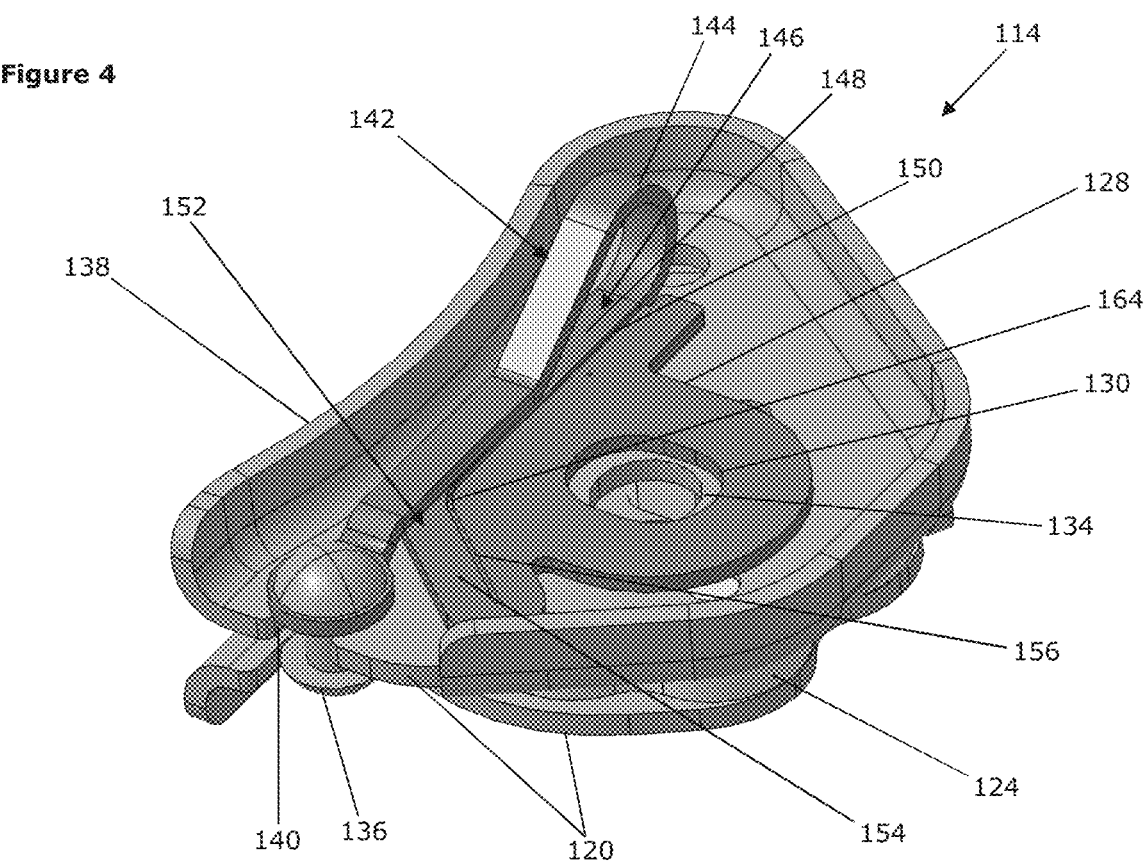
FIG. 4 is an isolated perspective view of one of the capsule assemblies of the steering column assembly of FIG. 1.

The shroud 102 of the present embodiment is telescopically arranged with a lower shroud 117 such that the shroud 102 is adjustable in relation to the lower shroud 117 and fixed in position by the clamping assembly 116. The shroud 102 may therefore be called the upper shroud. The lower shroud 117 is attachable to a steering gearbox (not shown). During collapse, the shroud 102 may collapse onto the lower shroud 117, such that their combined length shortens. One of the capsule assemblies 114 is shown in FIG. 4. The two capsule assemblies 114 are mirror images of one another but are otherwise identical. As such, only one will be described in detail.

Figure 3:
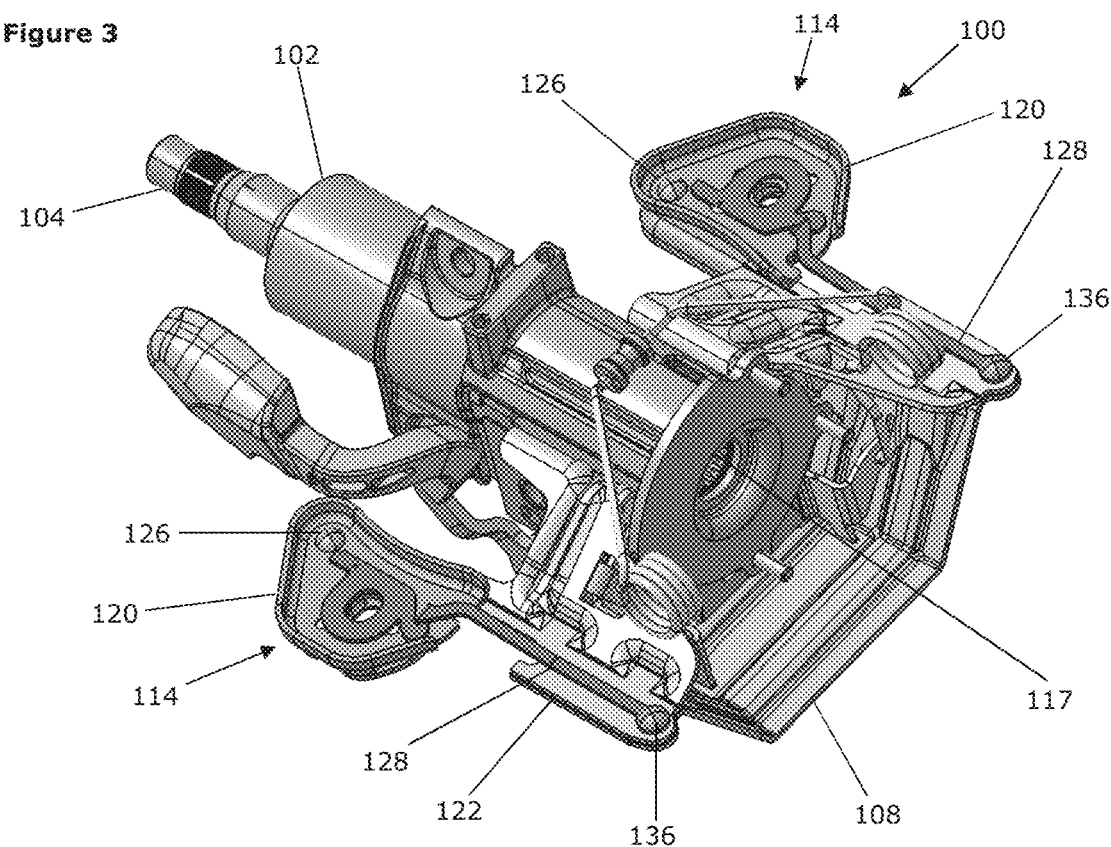
FIG. 3 is an inverted perspective view of the steering column assembly of FIG. 1, after a collapse.

The capsule assembly 114 includes a capsule body 118 comprising two body portions 120. When in position on the support bracket 108, the body portions 120 sandwich a wing 122 of the support bracket 108. Each wing 122 of the support bracket 108 extends out from the side of the support bracket 108, as can be seen in FIG. 3. The body portions 120 of the present embodiment also sandwich an insert 124 that, in use, is situated adjacent to the wing 122. The insert 124 therefore provides a guiding surface along which the wing 122 of the support bracket 108 can slide, during a collapse of the steering column assembly 100. The collapse process will be discussed further below. A first connector 126, shown in FIG. 3, extends through both body portions 120 and holds them in position around the wing 122 and relative to one another.

Each capsule assembly 114 also comprises an energy-absorbing strap 128. The energy-absorbing strap 128 is configured to absorb energy during a collapse of the steering column assembly 100. In the present embodiment, this is achieved by deformation of the energy-absorbing strap 128 caused by relative movement of the capsule body 118 and the support bracket 118.

The energy-absorbing strap 128 comprises a deformable member having two ends. Towards a first end, the energy-absorbing strap 128 includes a strap aperture 130. The strap aperture 130 allows the energy-absorbing strap 128 to be attached, in use, to the mounting bracket 112 by use of a second connector 132, shown in FIG. 1. The second connector 132 also extends through a capsule aperture 134 in each body portion 120 of the capsule body 118. Hence, a single second connector 132 attaches both the capsule body 118 and the energy-absorbing strap 128 to the mounting bracket 112, in use. However, it is equally possible to use separate connectors to connect each of the capsule body 118 and the energy-absorbing strap 128 to the mounting bracket 112.

Towards a second end, the energy-absorbing strap 128 is connected to the support bracket 108. In the depicted embodiment, the attachment is to the wing 122 of the support bracket 108 but the attachment could be to any other part of the support bracket 108. The attachment is provided by a third connector 136 which in the depicted embodiment takes the form of a rivet.

As can be seen, the energy-absorbing strap 128, prior to collapse of the steering column assembly 100, is contained within a perimeter of the capsule body 118. A well 138 is located around the perimeter of the capsule body 118, apart from the portion of the perimeter over which the energy-absorbing strap 128 passes during collapse of the steering column assembly 100. The wall 138 protects the energy-absorbing strap 128 from damage, for example prior to assembly.

Prior to collapse of the steering column assembly 100, the third connector 136 also inter-engages with the capsule body 118. In the present embodiment, this is achieved by locating the third connector 136 within a guide 140 in the capsule body 118. The guide 140, which takes the form of a slot or notch in the capsule body 118, provides resistance to movement of the support bracket 108 relative to the mounting bracket 112, due to the second connector 132 holding the capsule body 118 relative to the mounting bracket 112. The third connector 136, in this case the rivet, can be applied at a predetermined tension to the capsule body 118 in order that it is released from the capsule body 118, by sliding out of the guide 140, when the predetermined tension is overcome.

Rather than using a third connector 136 under tension in a guide 140, as in the present embodiment, it is also possible to provide the third connector such that it is released in other ways. For example, the third connector may be at least in part frangible such that it fractures when subjected to a predetermined force. A frangible connector may be received within an aperture in the capsule body rather than a guide, as the frangibility alone may be sufficient to disconnect the connector from the capsule body.

Collapse of the steering column assembly 100 will therefore be triggered initially by a force sufficient to overcome the predetermined force that releases the third connector 136 from the guide 140 of the capsule body 118. After initiation of collapse, the energy-absorbing strap 128 acts to provide a controlled collapse by absorbing a set amount of energy through deformation of the energy-absorbing strap 128. The energy-absorbance of the energy-absorbing strap 128 can be tailored by adaptation of the design of portions of the energy-absorbing strap 128.

Figure 5:
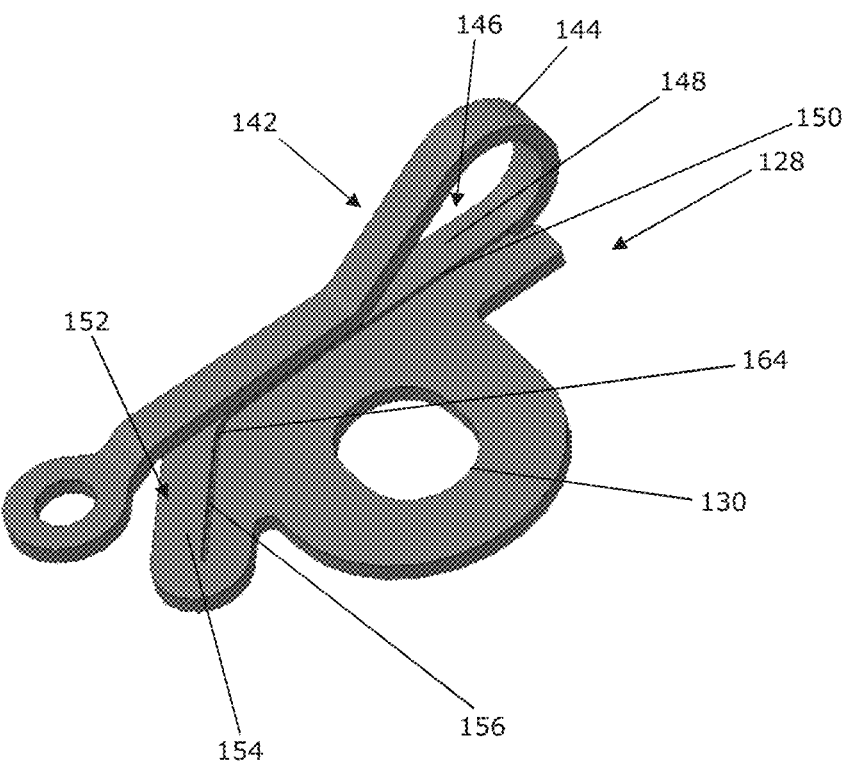
FIG. 5 is an isolated perspective view of the energy-absorbing strap shown in FIG. 4.

The energy-absorbing strap 128 of the depicted embodiment includes three distinct energy-absorbing parts, each with different energy-absorbance characteristics and which are visible in FIGS. 4 and 5. Of course, depending on the requirements of the steering column assembly 100, a greater or lesser number of distinct energy-absorbing parts may be required.

The first energy-absorbing part 142 includes a loop 144. The loop 144 is the first part of the energy-absorbing strap 128 that deforms once the steering column assembly 100 has begun to collapse and the loop 144 interconnects the third connector 136 and the remainder of the energy-absorbing strap 128. Deformation of the loop 144 absorbs a relatively small amount of energy and therefore does not greatly increase the amount of energy required to separate the third connector 136 from the capsule body 118 during the initiation of collapse.

The second energy-absorbing part 146 includes a first frangible portion 148 demarcated by a first weakened portion taking the form of a first groove 150 in the energy-absorbing strap 128. Thus, once the loop 144 has deformed, the collapse of the steering column assembly 100 causes the tearing along the first groove 150 such that the first frangible portion 148 can deform relative to the remainder of the energy-absorbing strap 128. The groove 150 of the second energy-absorbing part 146 extends in a direction parallel to the movement of the support bracket 108 relative to the capsule body 118 during collapse.

The third energy-absorbing part 152 includes a second frangible portion 154 demarcated by a second weakened portion taking the form of a second groove 156 in the energy-absorbing strap 128. The second groove 156, which is attached to the end of the first groove 150 and of which tearing is initiated once the first groove 150 has completely torn, is inclined at an angle to the direction of movement of the support bracket 108 relative to the capsule body 118 during collapse. Due to the angle of the second groove 156, the amount of tearing required per unit length of collapse of the steering column assembly 100 is greater for the second frangible portion 146 than for the first frangible portion 148. The second groove 156 has the same cross-section as the first groove 150 and so the amount of energy absorbed through tearing the second frangible portion 154 is greater than that absorbed through tearing the first frangible portion 148, due to the angle of the tear.

Although, in the depicted embodiment, the first groove 150 and second groove 156 have the same cross-section, changing the cross-section, for example the shape, depth, or other characteristic of the grooves 150, 156 can enable the energy-absorbance characteristics of each of the first and second frangible portions 148, 154 to be tailored to design requirements.

Figure 2:
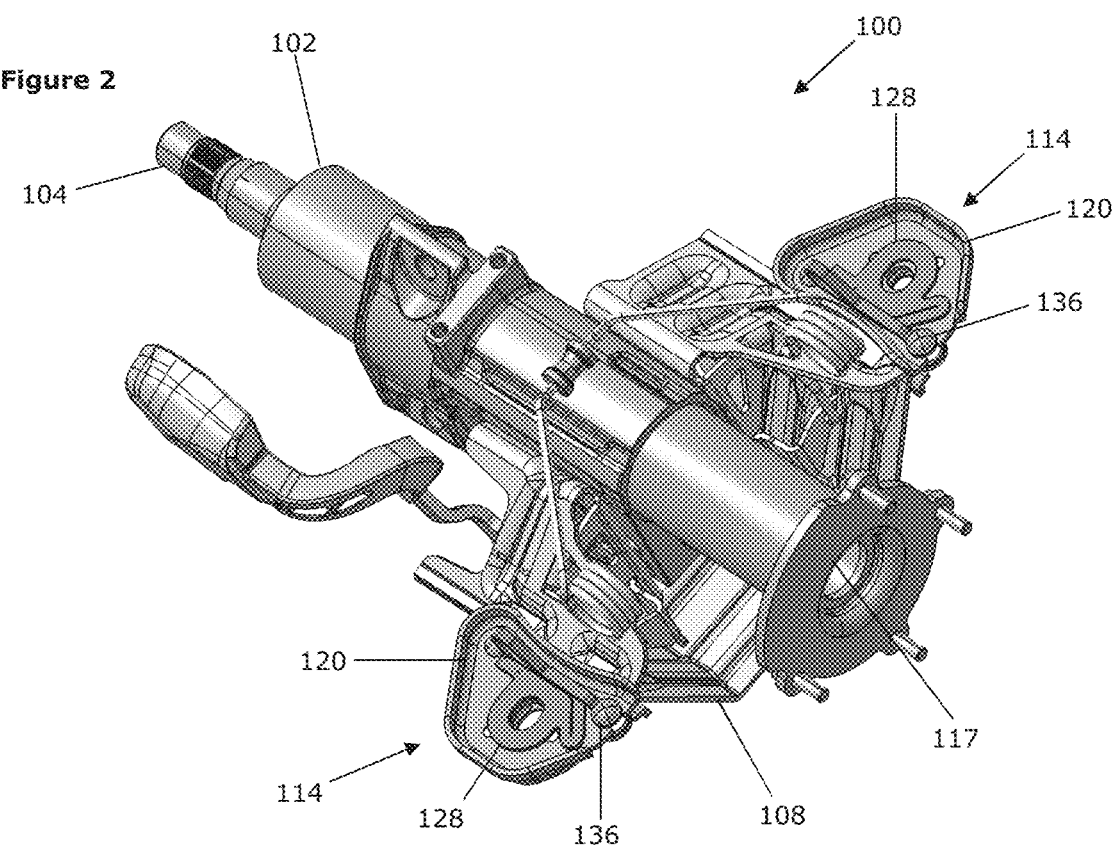
FIG. 2 is an inverted perspective view of the steering column assembly of FIG. 1, prior to a collapse.
Figure 6:
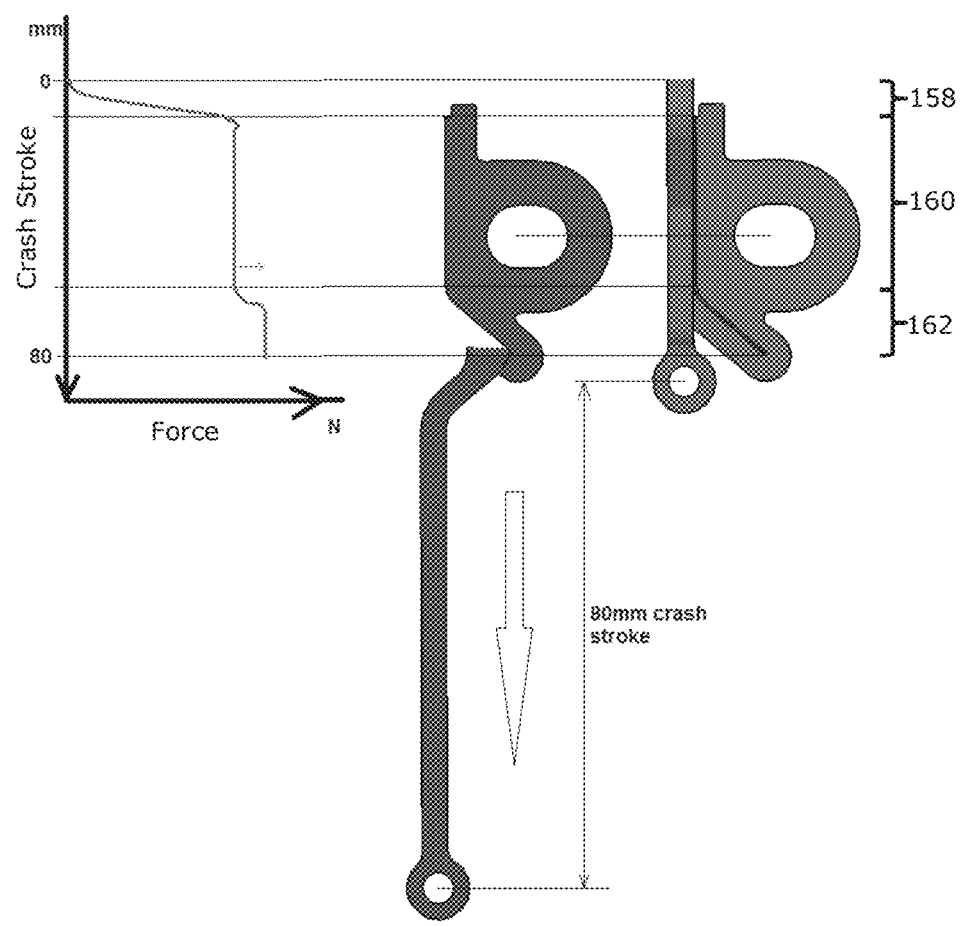
FIG. 6 is a diagram of the crash stroke, showing the force required to deform the energy-absorbing strap.

The energy-absorbing strap 128 is configured to absorb energy over the full length of the collapse stroke of the steering column assembly 100. The first energy-absorbing part 142 therefore absorbs energy over a first part 158 of the collapse stroke, the second energy-absorbing part 146 absorbs energy over a second part 160 of the collapse stroke, and the third energy-absorbing part 152 absorbs energy over a third part 162 of the collapse stroke. It is desirable for the energy-absorbing strap 128 to absorb different amounts of energy throughout the collapse stroke, also known as a crash stroke. The three energy-absorbing parts 142, 148, 152 of the present embodiment absorb energy in three distinct portions, as shown in FIG. 6. FIG. 2 and FIG. 3 show the steering column assembly 100 at the beginning and end of the crash stroke, respectively, although the second connector 132 and mounting bracket 112 are omitted from view.

The first energy-absorbing part 142 ensures that the force required for the first part 158 of the collapse stroke builds gradually over the length of the first part 158 of the collapse stroke. The gradual build-up of energy-absorbance is achieved in the present embodiment by the loop 144, which deforms such that the radius of the loop 144 grows tighter, requiring a gradually increasing resistance to deformation.

At the beginning of deformation of the second energy-absorbing part 146, the force peaks—at the initiation of the tear of the first frangible portion 148—and then settles at a steady energy-absorbance for the length of the first groove 150.

At the beginning of deformation of the third energy-absorbing part 152, the force gradually increases as the tear propagates around a radius 164 providing a transition between the first groove 150 and the second groove 156. The energy-absorbance then stays at a maximum, due to the angle of the second groove 156, until the full crash stroke is complete. In the present embodiment, the length of the crash stroke is 80 mm. Approximately 10 mm of the crash stroke is provided by the first energy-absorbing part 142, approximately 50 mm by the second energy-absorbing part 146, and approximately 20 mm by the third energy-absorbing part 152.

It can therefore be seen on FIG. 6 that each energy-absorbing part 142, 146, 152 has a greater rate of energy absorption—defined as the force required to move a unit length of crash stroke—than the preceding energy-absorbing part 142, 146, 152. Although this is desirable in the present embodiment, other combinations of energy-absorbance rates may be provided for different design requirements.

The energy-absorbing parts of the present embodiment control the energy-absorbance through their features as described above. However, any other type of feature may be provided which can control the energy-absorbance of each part of the energy-absorbing strap in order to provide the desired crash stroke characteristics.

What is claimed is:

1. A support bracket assembly for fixing a shroud of a steering column assembly to a vehicle, the support bracket assembly comprising:
   a support bracket fixable to the shroud; and
   a capsule assembly for interconnecting the support bracket with a fixed part of the vehicle, the capsule assembly comprising:
   a capsule body; and
   an energy-absorbing strap;
   wherein the capsule body and energy-absorbing strap are configured to be fixed to the fixed part of the vehicle;
   wherein, prior to an application of a predetermined force to the support bracket, the capsule body, energy-absorbing strap, and support bracket are directly interconnected by a connector and further wherein, upon application of the predetermined force to the support bracket, the connector is configured to separate from the capsule body whilst continuing to directly interconnect the energy-absorbing strap and support bracket.

2. The support bracket assembly according to claim 1, wherein the capsule body includes a capsule aperture for receiving a further connector for connecting the capsule body to the fixed part of the vehicle.

3. The support bracket assembly according to claim 2 wherein the energy-absorbing strap includes a strap aperture for receiving a further connector for connecting the energy-absorbing strap to the fixed part of the vehicle.

4. The support bracket assembly according to claim 3 wherein the capsule aperture and strap aperture are aligned or substantially aligned such that they can receive the same further connector.

5. The support bracket assembly according to claim 1 wherein the energy-absorbing strap is seated on the capsule body.

6. The support bracket assembly according to claim 1 wherein the capsule body includes a wall that at least partially surrounds the energy-absorbing strap.

7. The support bracket assembly according to claim 1 wherein the energy-absorbing strap is located within a perimeter of the capsule body.

8. The support bracket assembly according to claim 1 wherein the connector is configured to slidably separate from the capsule body.

9. The support bracket assembly according to claim 8 wherein the connector is configured to slidably separate from a guide in the capsule body.

10. The support bracket assembly according to claim 9 wherein the guide is in the form of a slot or a notch.

11. The support bracket assembly according to claim 1 wherein the connector is retained within through-holes in the energy-absorbing strap and support bracket.

12. A support bracket assembly according to claim 1 wherein the energy-absorbing strap includes a plurality of energy-absorbing parts, the energy-absorbing parts having different rates of energy absorption.

13. The support bracket assembly according to claim 12 wherein the plurality of energy-absorbing parts includes a first part with a first rate of energy absorption and a second part with a second rate of energy absorption.

14. The support bracket assembly according to claim 13 wherein the second rate of energy absorption is higher than the first rate of energy absorption.

15. The support bracket assembly according to claim 13 wherein the plurality of energy-absorbing parts includes a third part with a third rate of energy absorption.

16. The support bracket assembly according to claim 15 wherein the third rate of energy absorption is higher than the second rate of energy absorption.

17. The support bracket assembly according to any of claim 16 wherein the plurality of energy-absorbing parts includes a loop.

18. The support bracket assembly according to claim 17 wherein the loop is configured to deform without tearing of the energy-absorbing strap.

19. The support bracket assembly according to claim 18 wherein the plurality of energy-absorbing parts includes a first frangible portion having a weakened section defining a tear direction of the first frangible portion.

20. The support bracket assembly according to according to claim 19 wherein the plurality of energy-absorbing parts includes a second frangible portion having a weakened section defining a tear direction of the second frangible portion.

* * * * *